United States Patent
Hsieh

(10) Patent No.: US 12,015,369 B2
(45) Date of Patent: Jun. 18, 2024

(54) DUAL-VOLTAGE DOOR OPERATOR CONTROL SYSTEM

(71) Applicant: Chung Hsien Hsieh, New Taipei (TW)

(72) Inventor: Chung Hsien Hsieh, New Taipei (TW)

( * ) Notice: Subject to any disclaimer, the term of this patent is extended or adjusted under 35 U.S.C. 154(b) by 27 days.

(21) Appl. No.: 18/050,498

(22) Filed: Oct. 28, 2022

(65) Prior Publication Data

US 2023/0142124 A1   May 11, 2023

(30) Foreign Application Priority Data

Nov. 8, 2021 (TW) .................................. 110141468

(51) Int. Cl.
| | |
|---|---|
| *H02P 7/06* | (2006.01) |
| *E05F 15/60* | (2015.01) |
| *H02P 7/20* | (2006.01) |

(52) U.S. Cl.
CPC ............... *H02P 7/20* (2013.01); *E05F 15/60* (2015.01); *E05Y 2201/434* (2013.01); *E05Y 2900/132* (2013.01)

(58) Field of Classification Search
CPC ...................................... H02P 7/20; H02P 3/04
See application file for complete search history.

(56) References Cited

FOREIGN PATENT DOCUMENTS

| | | | |
|---|---|---|---|
| CN | 2211627 Y | * | 11/1995 |
| CN | 110254272 A | * | 9/2019 |
| JP | 2015153651 A | * | 8/2015 |

* cited by examiner

*Primary Examiner* — Karen Masih
(74) *Attorney, Agent, or Firm* — McClure, Qualey & Rodack, LLP

(57) ABSTRACT

A dual-voltage door operator control system comprises a contactor, a high-voltage connector, a low-voltage connector, a rectifier and a brake. When a door operator motor is electrically coupled to the low-voltage connector, the rectifier full-wave rectifies an external power source and then electrically energizes the brake. When the door operator motor is electrically coupled to the high-voltage connector, the rectifier half-wave rectifies the external power source and then electrically energizes the brake. Accordingly, the door operator motor can be connected to the high-voltage connector or the low-voltage connector according to the specification of the external power source provided at the site. Moreover, the invention is also further integrated with the brake of a single specification, and no matter whether the external power source is a high-voltage power source or a low-voltage power source, it can electrically energize the brake through the rectifier.

10 Claims, 5 Drawing Sheets

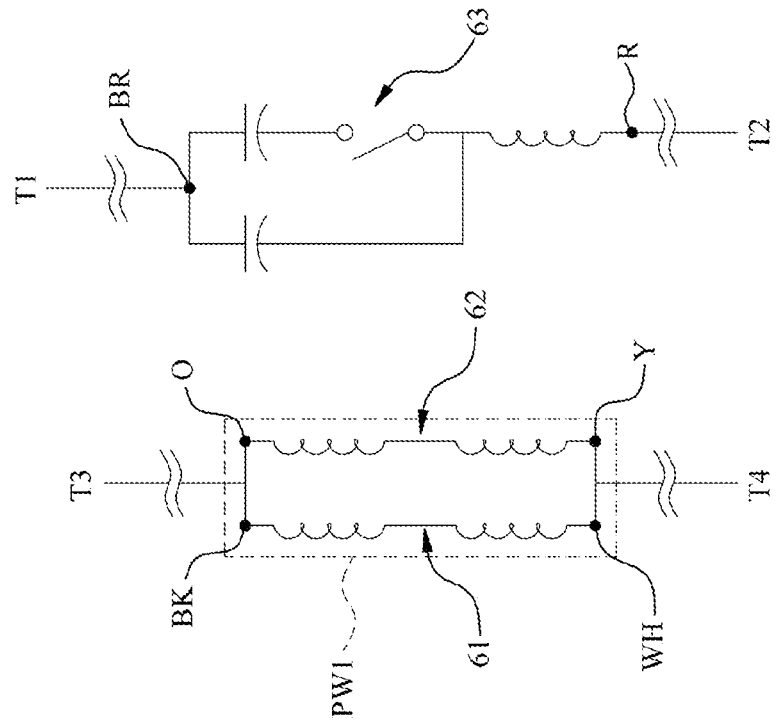
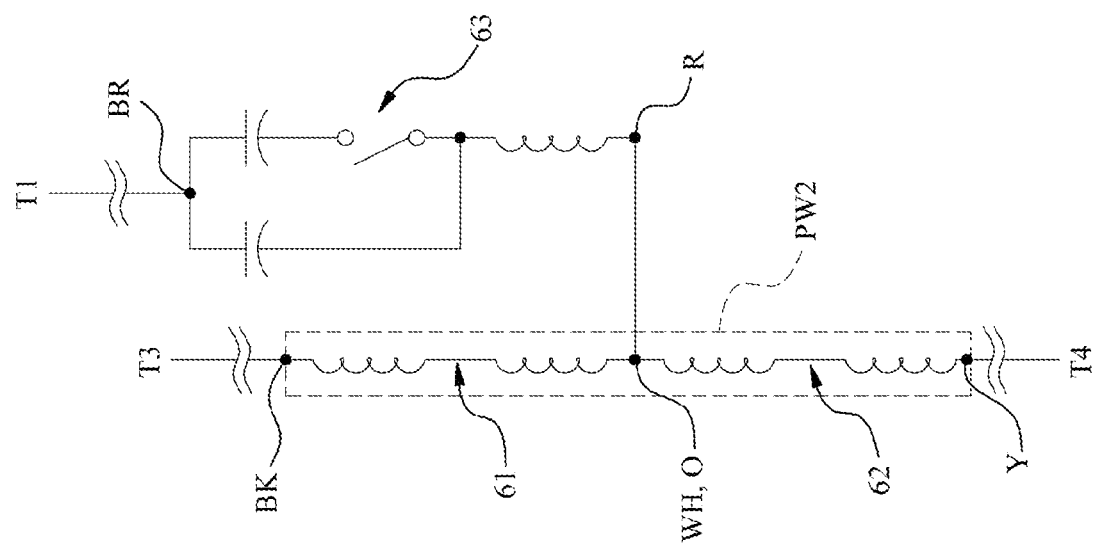
FIG. 3A
FIG. 3B

DUAL-VOLTAGE DOOR OPERATOR CONTROL SYSTEM

BACKGROUND OF THE INVENTION

Field of the Invention

The present invention relates to a dual-voltage door operator control system compatible with two different voltages at the same time.

DESCRIPTION OF THE RELATED ART

Generally, power supply systems in many countries around the world can be roughly classified into single-phase electricity and three-phase electricity, and the single-phase electricity and the three-phase electricity in many countries each have different voltages. Taking the United States as an example, single-phase electricity has two different voltage specifications, i.e. a high voltage and a low voltage, wherein the low voltage is 115V, and the high voltage is 230V; on the other hand, three-phase electricity also has two different voltage specifications, i.e. a high voltage and a low voltage, wherein the low voltage is 230V and the high voltage is 460V.

In other words, the U.S. power supply system has four voltage specifications. However, for a long time, various voltage specifications have caused considerable trouble for door operator suppliers because the suppliers must develop and produce door operator systems for these four voltage specifications. Moreover, attention must also be paid to the power supply specifications of the site during installation. Once the installed door operator system does not meet the power supply specifications of the site, the door operator system may be unable to operate, and at worst, the door operator system may be burned down and even harm the personnel.

Accordingly, a dual-voltage door operator control system which is safe, reliable and compatible with at least two voltages is expected in the industry.

SUMMARY OF THE INVENTION

The main purpose of the present invention is to provide a dual-voltage door operator control system, which is compatible with at least two different voltages, is integrated with a brake, reduces development, manufacturing and inventory costs, simplifies installation procedures, and reduces the risk of installation failures.

In order to achieve the above object, the present invention provides a dual-voltage door operator control system, which mainly comprises a contactor, a high-voltage connector, a low-voltage connector, a rectifier and a brake. The contactor includes a power source side and a load side, and the power source side is electrically coupled to an external power source; the high-voltage connector, the low-voltage connector and the rectifier are electrically connected to the contactor; the brake is electrically connected to at least one of the contactor, the rectifier, the high-voltage connector and the low-voltage connector. A door operator motor is selectively coupled to the high-voltage connector or the low-voltage connector according to the external power source. When the door operator motor is electrically coupled to the low-voltage connector, the low-voltage connector enables the rectifier to full-wave rectify the external power source and then to electrically energize the brake; when the door operator motor is electrically coupled to the high-voltage connector, the high-voltage connector enables the rectifier to half-wave rectify the external power source and then to electrically energize the brake.

The door operator control system of the present invention can be compatible with the high voltage and the low voltage. The user can connect the motor to the corresponding high-voltage connector or low-voltage connector according to the voltage specification of the external power source provided at the site so that the external power source can electrically energize the entire system. Moreover, the system is also further integrated with a brake of a single specification, and no matter whether the external power source is a high-voltage power source or a low-voltage power source, the brake can be electrically energized through the rectifier.

Furthermore, when the external power source is a single-phase AC power source, the single-phase door operator motor includes a first running winding, a second running winding and a starting winding; the load side of the contactor includes a first connection terminal, a second connection terminal, a third connection terminal and a fourth connection terminal. If the external power source is a lower-voltage power source, the door operator motor is electrically coupled to the low-voltage connector, and the low-voltage connector connects the first running winding in parallel with the second running winding to form a running winding pair, electrically couples the first connection terminal and the second connection terminal to two ends of the starting winding respectively, and electrically couples the third connection terminal and the fourth connection terminal to two ends of the running winding pair. If the external power source is a high-voltage power source, the door operator motor is electrically coupled to the high-voltage connector, and the high-voltage connector connects the first running winding in series with the second running winding to form a running winding string, electrically couples the first connection terminal to one end of the starting winding, electrically couples the other end of the starting winding between the first running winding and the second running winding, and electrically couples the third connection terminal and the fourth connection terminal to two ends of the running winding string respectively.

Also, when the external power source is a three-phase AC power source, the three-phase door operator motor includes a plurality of windings; the load side of the contactor includes a first connection terminal, a second connection terminal and a third connection terminal. If the external power source is a low-voltage power source, the door operator motor is electrically coupled to the low-voltage connector, and the low-voltage connector enables the plurality of windings of the door operator motor to form a Y-Y connection and electrically couples the first connection terminal, the second connection terminal and the third connection terminal to three outer connection terminals of the Y-Y connection respectively. On the other hand, if the external power source is a high-voltage power source, the door operator motor is electrically coupled to the high-voltage connector, and the high-voltage connector enables the plurality of windings of the door operator motor to form a Y connection and electrically couples the first connection terminal, the second connection terminal and the third connection terminal to three outer connection terminals of the Y connection respectively.

BRIEF DESCRIPTION OF THE DRAWINGS

FIG. 3A is an equivalent circuit diagram of the windings of a door operator motor powered by a single-phase power source with a low-voltage.

FIG. 3B is an equivalent circuit diagram of the windings of the door operator motor powered by a single-phase power source with a high-voltage.

DESCRIPTION OF THE PREFERRED EMBODIMENTS

Figure 1:
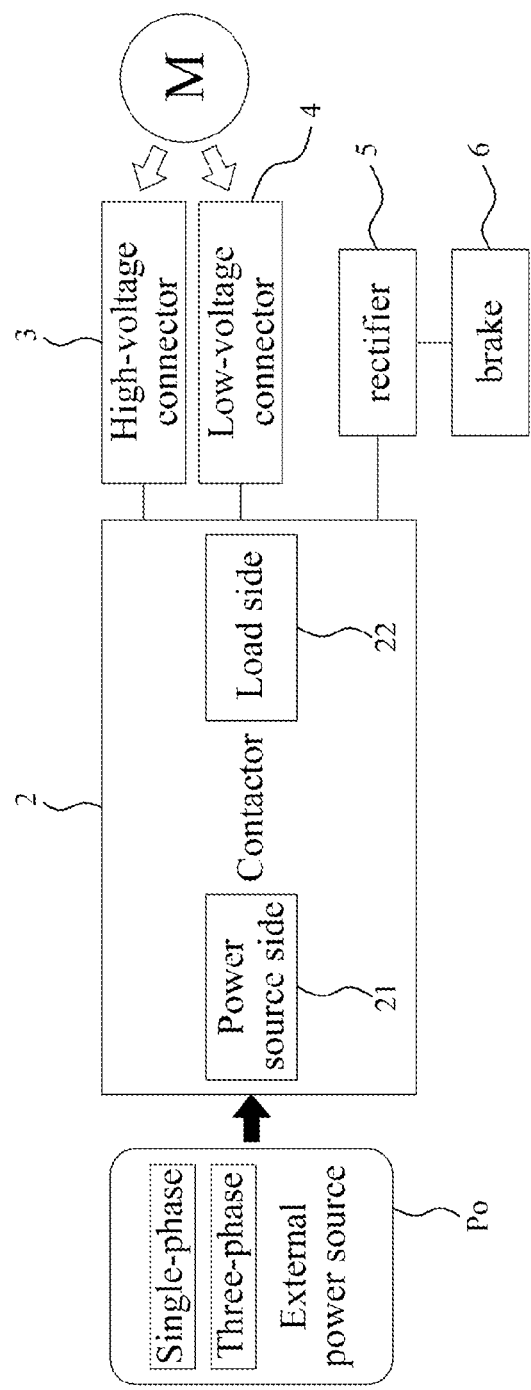
FIG. 1 is a block diagram of a system according to the present invention.

Before a dual-voltage door operator control system according to the present invention is described in detail in the embodiments, it should be noted that in the following description, similar components will be designated by the same reference numerals. Furthermore, the drawings of the present invention are for illustrative purposes only, they are not necessarily drawn to scale, and not all details are necessarily shown in the drawings.

Reference is made to FIG. 1, which is a block diagram of the system according to the present invention. The dual-voltage door operator control system of this embodiment includes two subsystems, which are adapted to a single-phase alternating current and a three-phase alternating current respectively. The single-phase subsystem or the three-phase subsystem of the present invention can be selected according to different power supply specifications, and each subsystem is compatible with at least two external power sources Po having different voltages, such as a high voltage and a low voltage.

Figure 2:
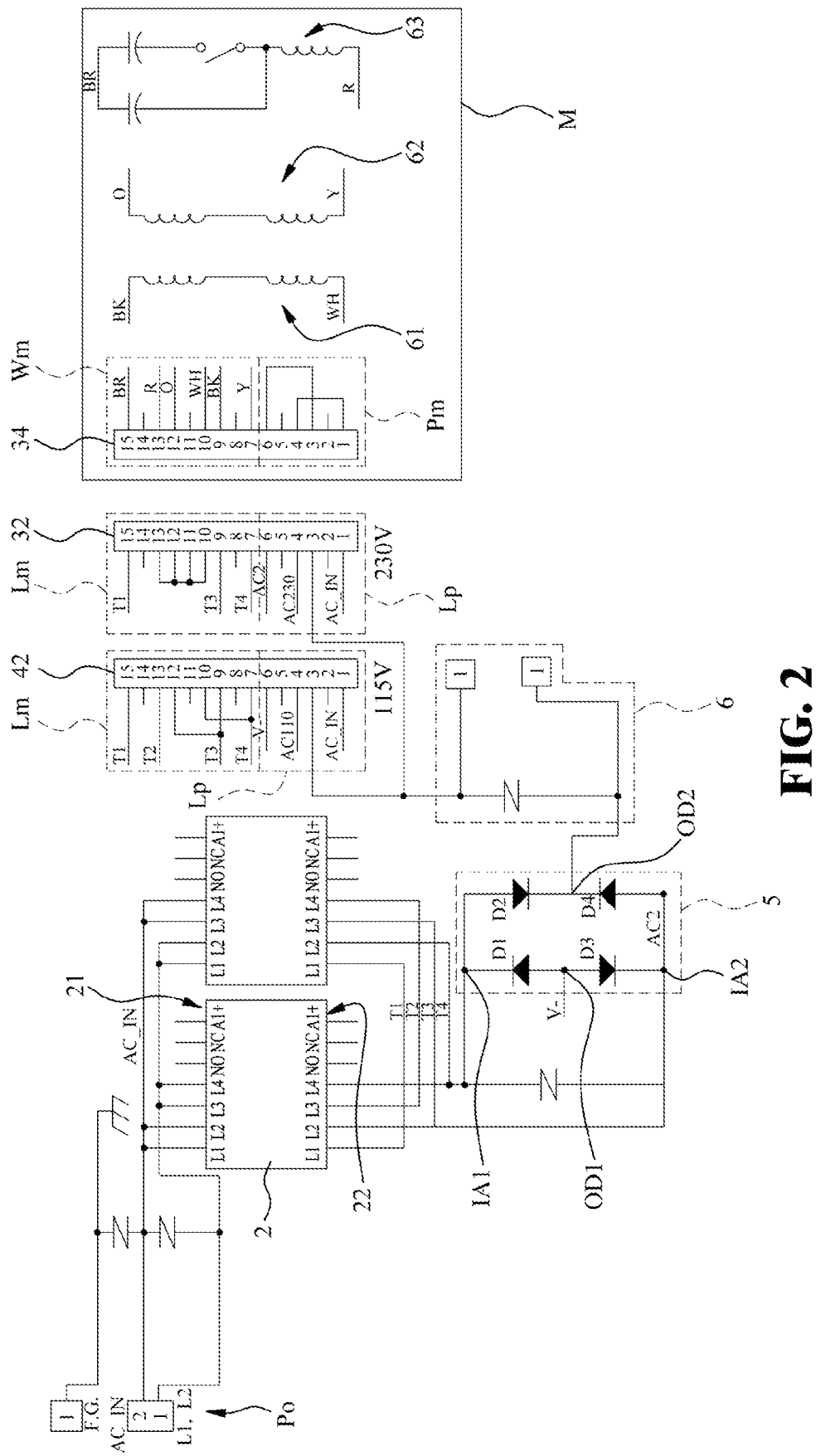
FIG. 2 is a circuit diagram of a single-phase system according to a preferred embodiment of the present invention.

Reference is made to FIG. 1 and FIG. 2 at the same time. FIG. 2 is a circuit diagram of the single-phase system according to a preferred embodiment of the present invention. The single-phase system will be described below. As shown in the figure, the single-phase system of this embodiment mainly comprises a contactor 2, a high-voltage connector 3, a low-voltage connector 4, a rectifier 5 and a brake 6. The contactor 2 includes a power source side 21 and a load side 22, wherein the power source side 21 is electrically coupled to an external power source Po, and the load side 22 includes a first connection terminal T1, a second connection terminal T2, a third connection terminal T3 and a fourth connection terminal T4.

Furthermore, the rectifier 5 in this embodiment is a bridge rectifier, which includes two AC voltage input ends IA1 and IA2 electrically connected to the fourth connection terminal T4 and the third connection terminal T3 respectively; one DC voltage output end OD1 of the rectifier 5 is electrically connected to the high-voltage connector 3 and the low-voltage connector 4, and the other DC voltage output end OD2 is electrically connected to the brake 6. The arrangements of connection lines will be described in detail later. In addition, one end of the brake 6 is electrically connected to the third terminals of the high-voltage connector 3 and the low-voltage connector 4, and the other end is electrically connected to the DC voltage output end OD2 of the rectifier 5.

Moreover, the high-voltage connector 3 includes a female socket 32, the low-voltage connector 4 includes a female socket 42, and a male plug 34 is disposed on a door operator motor M. Furthermore, the male plug 34 includes a winding terminal part Wm and a power source jumper part Pm, and the winding terminal part Wm is electrically connected to the connection terminals of each winding of the door operator motor M.

The door operator motor M of this embodiment includes a first running winding 61, a second running winding 62 and a starting winding 63. As shown in FIG. 2, two connection terminals BK and WH of the first running winding 61 are electrically connected to the ninth terminal and the tenth terminal of the winding terminal part Wm of the male plug 34 respectively; two connection terminals O and Y of the second running winding 62 are electrically connected to the twelfth terminal and the seventh terminal of the winding terminal part Wm respectively; two connection terminals BR and R of the starting winding 63 are electrically connected to the fifteenth terminal and the thirteenth terminal of the winding terminal part Wm respectively.

On the other hand, in the power source jumper part Pm of the male plug 34, the first terminal and the fourth terminal are connected to each other, and the third terminal and the sixth terminal are connected to each other. Its purpose will be described in detail later.

Next, the female socket 42 of the low-voltage connector 4 will be described below, which includes a connection terminal part Lm and a power source terminal part Lp. In the connection terminal part Lm, the fifteenth terminal is electrically coupled to the first connection terminal T1 of the load side 22 of the contactor 2; the thirteenth terminal is electrically coupled to the second connection terminal T2 of the load side 22 of the contactor 2; the twelfth terminal is connected in parallel with the ninth terminal and then electrically coupled to the third connection terminal T3 of the load side 22 of the contactor 2; the tenth terminal is connected in parallel with the seventh terminal and then electrically coupled to the fourth connection terminal T4 of the load side 22 of the contactor 2.

Reference is made to FIG. 2 and FIG. 3A. FIG. 3A is an equivalent circuit diagram of the windings of the door operator motor powered by a single-phase power source with a low-voltage (115V). After the male plug 34 of the door operator motor M is inserted into the female socket 42, by means of the fact that the twelfth terminal is connected in parallel to the ninth terminal in the female socket 42 and the fact that the tenth terminal is connected in parallel to the seventh terminal in the female socket 42, the corresponding windings connected to these terminals of the male plug 34 are connected in parallel accordingly. That is, as shown in the equivalent circuit diagram of FIG. 3A, the first running winding 61 is connected in parallel with the second running winding 62 to form a running winding pair PW1.

In addition, after the male plug 34 of the door operator motor M is inserted into the female socket 42, the first connection terminal T1 and the second connection terminal T2 are electrically coupled to the two connection terminals BR and R of the starting winding 63 through the fifteenth terminals and the thirteenth terminals of the male plug 34 and the female socket 42 respectively. Similarly, the third connection terminal T3 and the fourth connection terminal T4 are electrically coupled to two ends of the running winding pair PW1 (i.e. the terminals BK-O and WH-Y)

through the ninth terminals and the seventh terminals of the male plug 34 and the female socket 42 respectively.

Besides, with regard to the power source terminal part Lp of the female socket 42, the sixth terminal is electrically connected to the end V− of the external power source Po, which is connected to the third terminal through a corresponding jumper connection of the male plug 34, and one terminal of the brake 6 is also connected to the third terminal. Moreover, the first terminal is electrically connected to the end AC_IN of the external power source Po, which is connected to the fourth terminal through a corresponding jumper connection of the male plug 34 and then to the input end AC110 of a power supply transformer (not shown in the figure) so as to electrically energize the entire system.

On the other hand, as shown in FIG. 2, the DC voltage output end OD1 of the rectifier 5 is electrically coupled to the end V− of the external power source Po through the sixth terminal of the female socket 42 of the low-voltage connector 4, and the other DC voltage output end OD2 is electrically coupled to the brake 6. Accordingly, the power obtained after performing full-wave rectification by the rectifier 5 will be applied to the brake 6. In this embodiment, the input voltage of the AC power source is 115V, and the output voltage of the power outputted by the rectifier 5 is about 103.5V.

After the male plug 34 of the door operator motor M is inserted into the female socket 42 (i.e. the connection of the low-voltage connector 4 is completed), the external power source Po electrically energizes the entire door operator system, wherein the ends AC110 and V− of the external power source Po are electrically connected to the contactor 2, the rectifier 5 and brake 6.

Reference is made to FIG. 2 and FIG. 3B. FIG. 3B is an equivalent circuit diagram of the windings of the door operator motor powered by a single-phase power source with a high voltage. The configuration relevant to the single-phase power source with a high voltage (e.g. 230V) in this embodiment will be described below. Briefly, the main difference between the present embodiment and the aforementioned embodiment only lies in the connection configurations of the female sockets 32 and 42.

The female socket 32 of this embodiment also includes a connection terminal part Lm and a power source terminal part Lp. In the connection terminal part Lm, the fifteen terminal is electrically coupled to the first connection terminal T1 of the load side 22 of the contactor 2; the thirteen terminal, the twelfth terminal, the eleventh terminal and the tenth terminal are electrically connected to one another. Furthermore, the ninth terminal is electrically coupled to the third connection terminal T3 of the load side 22 of the contactor 2; the seventh terminal is electrically coupled to the fourth connection terminal T4 of the load side 22 of the contactor 2.

Accordingly, after the male plug 34 of the door operator motor M is inserted into the female socket 32, by means of the fact that the thirteen terminal, the twelfth terminal and the tenth terminal of the female socket 32 are electrically connected to each other, the first running winding 61 of the motor M is connected in series with the second running winding 62 to form a running winding string PW2, that is, the connection terminal WH of the first running winding 61 and the connection terminal O of the second running winding 62 are connected to each other, and the connection terminal R of the starting winding 63 is electrically connected to the connection terminal WH of the first running winding 61 and the connection terminal O of the second running winding 62, as shown in the equivalent circuit diagram of FIG. 3B.

When the male plug 34 of the door operator motor M is inserted into the female socket 32, the first running winding 61 of the door operator motor M is connected in series with the second running winding 62 to form the running winding string PW2, the first terminal T1 is electrically coupled to the connection terminal BR of the starting winding 63, the other connection terminal R of the starting winding 63 is electrically coupled between the first running winding 61 and the second running winding 62, and the third connection terminal T3 and the fourth connection terminal T4 are electrically coupled to two ends of the running winding string PW2 (i.e. the connection terminal BK of the first running winding 61 and the connection terminal Y of the second running winding 62), respectively.

Furthermore, with regard to the power source terminal part Lp of the female socket 32, the sixth terminal is electrically connected to the end AC2 of the external power source Po, which is connected to the third terminal through a jumper connection of the male plug 34, and one terminal of the brake 6 is also connected to the third terminal. In addition, the first terminal is electrically connected to the end AC_IN of the external power source Po, which is connected to the fourth terminal through a jumper connection of the male plug 34 and then to the input end AC230 of a power supply transformer (not shown in the figure) so as to electrically energize the entire system.

On the other hand, as shown in FIG. 2, as the AC voltage input end IA2 of the rectifier 5 is electrically coupled to the end AC2 of the external power source Po, after the male plug 34 of the door operator motor M is inserted into the female socket 32, the external power source Po electrically energizes the entire door operator system, and the rectifier 5 performs half-wave rectification. In this embodiment, the voltage of the output power obtained by performing half-wave rectification on the 230V AC power source by the rectifier 5 is about 103.5V.

Figure 4:
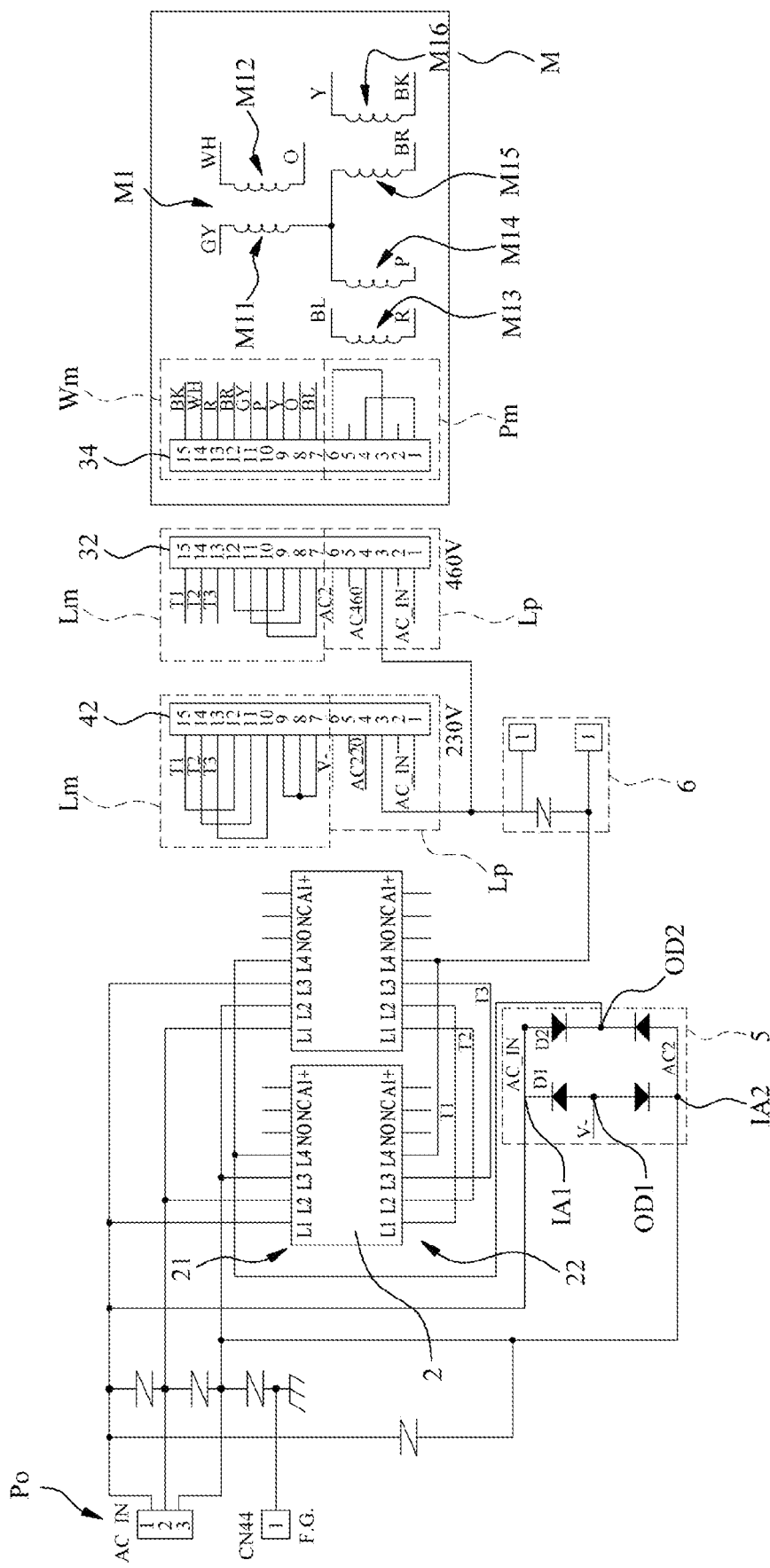
FIG. 4 is a circuit diagram of a three-phase system according to a preferred embodiment of the present invention.

Reference is made to FIG. 1 and FIG. 4. FIG. 4 is a circuit diagram of a three-phase system according to a preferred embodiment of the present invention. As shown in the figure, the three-phase system of this embodiment is similar to the aforementioned single-phase system and also comprises a contactor 2, a high-voltage connector 3, a low-voltage connector 4, a rectifier 5 and a brake 6. The difference lies in that the load side 22 of the contactor 2 has only three connection terminals, namely the first connection terminal T1, the second connection terminal T2 and the third connection terminal T3.

In addition, the rectifier 5 of this embodiment is also slightly different from that of the aforementioned single-phase system in connection pattern. The two AC voltage input ends IA1 and IA2 of the rectifier 5 in this embodiment are electrically connected to a three-phase AC power source (an external power source Po), the DC voltage output end OD1 of the rectifier 5 is electrically connected to the end V− of the external power source Po through the sixth terminal of the female socket 42 of the low-voltage connector 4, and the other DC voltage output end OD2 of the rectifier 5 is electrically connected to the power source side 21 of the contactor 2 (e.g. the terminal L4) while the corresponding terminal (e.g. the terminal T4) of the load side 22 of the contactor 2 is electrically connected to the brake 6. Briefly, in this embodiment, the brake is electrically energized through the contactor 2.

Moreover, the door operator motor M of this embodiment is a three-phase induction motor and mainly includes a first winding M11, a second winding M12, a third winding M13, a fourth winding M14, a fifth winding M15 and a sixth winding M16. Also, as shown in FIG. 4, one connection terminal GY of the first winding M11 is electrically connected to the eleventh terminal of the winding terminal part Wm of the male plug 34, and the other connection terminal of the first winding M11 is connected to the fourth winding M14 and the fifth winding M15; the two connection terminals WH and O of the second winding M12 are electrically connected to the fourteenth terminal and the eighth terminal of the winding terminal part Wm of the male plug 34 respectively.

On the other hand, the two connection terminals BL and R of the third winding M13 are electrically connected to the seventh terminal and the thirteenth terminal of the winding terminal part Wm of the male plug 34 respectively; one connection terminal P of the fourth winding M14 is electrically connected to the tenth terminal of the winding terminal part Wm, and the other connection terminal of the fourth winding M14 is connected to the first winding M11 and the fifth winding M15; one connection terminal BR of the fifth winding M15 is electrically connected to the twelfth terminal of the winding terminal part Wm, and the other connection terminal is connected to the first winding M11 and the fourth winding M14; and two connection terminals Y and BK of the sixth winding M16 are electrically connected to the ninth terminal and the fifteenth terminal of the winding terminal part Wm respectively.

Similarly, in the power source jumper part Pm of the male plug 34 of the present embodiment, the first terminal and the fourth terminal are connected, and the third terminal and the sixth terminal are connected so that the jumper connections for the power supply can be made. Its purpose will be described in detail later.

Next, the female socket 42 of the low-voltage connector 4 of the three-phase system will be illustrated below, wherein the fifteenth terminal of the connection terminal part Lm is connected in parallel to the twelfth terminal and then electrically couple to the first connection terminal T1 of the load side 22 of the contactor 2; the fourteenth terminal of the connection terminal part Lm is connected in parallel to the eleventh terminal and then electrically coupled to the second connection terminal T2 of the load side 22 of the contactor 2; the thirteenth terminal of the connection terminal part Lm is connected in parallel to the tenth terminal and then electrically coupled to the third connection terminal T3 of the load side 22 of the contactor 2; the ninth terminal, the eighth terminal and the seventh terminal of the connection terminal part Lm are connected in parallel to each other.

Figure 5A:
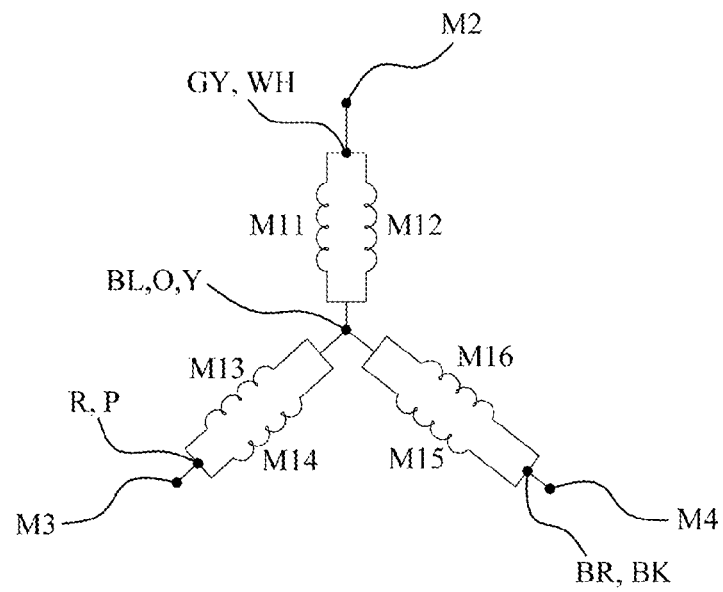
FIG. 5A is an equivalent circuit diagram of the windings of a door operator motor powered by a three-phase power source with a low-voltage.

Reference is made to FIG. 5A, which is an equivalent circuit diagram of the windings of the door operator motor powered by a three-phase power source with a low-voltage (e.g. 230V). After the male plug 34 of the door operator motor M is inserted into the female socket 42 (i.e. the connection of the low-voltage connector 4 is completed), through the configuration of the jumper connections of the tenth terminal to the fifteenth terminal in the female socket 42, the windings of the male plug 34 corresponding to these terminals of the female socket 42 are connected in parallel. That is, as shown in the equivalent circuit diagram of FIG. 5A, the first winding M11 is connected in parallel with the second winding M12, the third winding M13 is connected in parallel with the fourth winding M14, and the fifth winding M15 is connected in parallel with the sixth winding M16.

In fact, one of the main objects of the low-voltage connector 4 of this embodiment is to enable the six windings M1 of the door operator motor M to form a Y-Y connection and to electrically couple the first connection terminal T1, the second connection terminal T2 and the third connection terminal T3 to the three outer connection terminals M2, M3 and M4 of the Y-Y connection respectively.

Moreover, regarding the power source terminal part Lp of the female socket 42, the sixth terminal is electrically connected to the end V− of the external power source Po, which is connected to the third terminal through a corresponding jumper connection of the male plug 34, and one terminal of the brake 6 is also connected to the third terminal. In addition, the first terminal is electrically connected to the end AC_IN of the external power source Po, which is connected to the fourth terminal through a corresponding jumper connection of the male plug 34 and then to the input end AC220 of a power supply transformer (not shown in the figure) so as to electrically energize the entire system.

On the other hand, as shown in FIG. 4, the DC voltage output end OD1 of the rectifier 5 is electrically coupled to the end V− of the external power source Po, and the other DC voltage output end OD2 of the rectifier 5 is electrically coupled to the brake 6 through the contactor 2. Accordingly, the power obtained after performing full-wave rectification by the rectifier 5 is applied to the brake 6. In this embodiment, the voltage of the output power obtained by performing full-wave rectification on the 230V AC power source by the rectifier 5 is about 207V.

As in the embodiment of the single-phase system described above, after the male plug 34 of the door operator motor M is inserted into the female socket 42 (i.e. the connection of the low-voltage connector 4 is completed), the external power source Po electrically energizes the entire door operator system, wherein the ends AC220 and V− of the external power source Po are electrically connected to the contactor 2, the rectifier 5 and the brake 6.

Figure 5B:
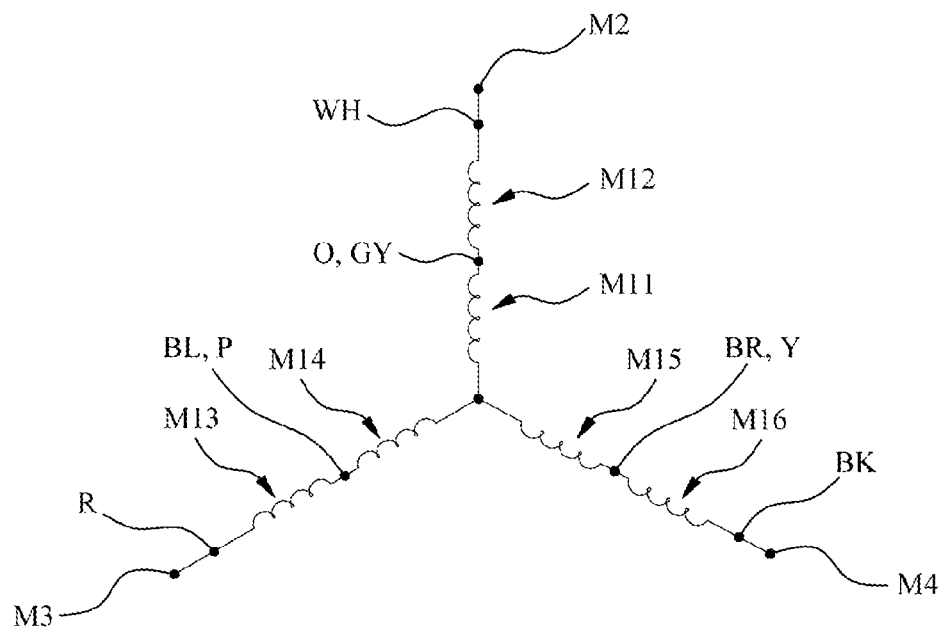
FIG. 5B is an equivalent circuit diagram of the windings of the door operator motor powered by a three-phase power source with a high-voltage.

Reference is made to FIG. 4 and FIG. 5B. FIG. 5B is an equivalent circuit diagram of the windings of the door operator motor powered by a three-phase power source with a high-voltage. The configuration relevant to the three-phase power source with a high-voltage (e.g. 460V) in this embodiment will be described below. The main difference between the present embodiment and the aforementioned embodiment only lies in the connection configurations of the female sockets 32 and 42.

In the connection terminal part Lm of the female socket 32, the thirteen terminal to the fifteen terminal are electrically coupled to the first connection terminal T1, the second connection terminal T2 and the third connection terminal T3 of the load side 22 of the contactor 2 respectively; the twelfth terminal is connected to the ninth terminal through a jumper connection; the eleventh terminal is connected to the eighth terminal through a jumper connection; the tenth terminal is connected to the seven terminal through a jumper connection.

Accordingly, after the male plug 34 of the door operator motor M is inserted into the female socket 32, the first winding M11 is connected in series with the second winding M12, the third winding M13 is connected in series with the fourth winding M14, and the fifth winding M15 is connected in series with the sixth winding M16 to form a Y connection through the jumper configuration of the connection terminal part Lm of the female socket 32. The first connection terminal T1, the second connection terminal T2 and the third connection terminal T3 are electrically coupled to the three outer connection terminals M2, M3 and M4 of the Y connection respectively.

Furthermore, regarding the power source terminal part Lp of the female socket 32, the sixth terminal is electrically connected to the end AC2 of the external power source Po, which is connected to the third terminal through a jumper configuration of the male plug 34, and one terminal of the brake 6 is also connected to the third terminal. In addition, the first terminal is electrically connected to the end AC_IN of the external power source Po, which is connected to the fourth terminal through a jumper configuration of the male plug 34 and then to the input end AC460 of a power supply transformer (not shown in the figure) so as to electrically energize the entire system.

On the other hand, as shown in FIG. 4, in order to enable the brake 6 to be adapted to the three-phase high-voltage AC power source and the three-phase low-voltage AC power source, when the system is connected to the three-phase high-voltage AC power source, the rectifier 5 performs a half-wave rectification, that is, the AC voltage input end IA2 of the rectifier 5 is electrically coupled to the end AC2 of the external power source Po. In this embodiment, the voltage of the output power obtained by performing half-wave rectification on the 460V AC power source by the rectifier 5 is about 207V.

In summary, the above embodiments provide a single-phase door operator control system and a three-phase door operator control system for a single-phase external power source and a three-phase external power source respectively, and each system is at least compatible with two different voltages, namely a high voltage and a low voltage. The user only needs to insert the male plug 34 of the door operator motor M into the female socket 32 for the high voltage or into the female socket 42 for the low voltage according to the power supply provided at the installation site.

Furthermore, after the connection is completed, the external power source Po can electrically energize the entire system. Through the jumper configuration of the female socket 32 or 42, the windings in the door operator motor M can be connected in a specific way so that the door operator motor M can be powered by the external power source of a high voltage or a low voltage. Moreover, in the present invention, the voltage of the external power supply Po is full-wave rectified or half-wave rectified by the rectifier 5 depending on the connection to the low-voltage connector 3 or the high-voltage connector 4 so that only a brake of a single power supply specification needs to be arranged. It is not necessary to arrange various brakes with different power supply specifications for different input voltages.

The preferred embodiments of the present invention are illustrative only, and the claimed inventions are not limited to the details disclosed in the drawings and the specification. Accordingly, it is intended that it have the full scope permitted by the language of the following claims.

What is claimed is:

1. A dual-voltage door operator control system, comprising:
    a contactor, including a power source side and a load side, the power source side being electrically coupled to an external power source;
    a high-voltage connector, electrically connected to the contactor;
    a low-voltage connector, electrically connected to the contactor;
    a rectifier, electrically connected to the contactor; and
    a brake, electrically connected to at least one of the contactor, the rectifier, the high-voltage connector and the low-voltage connector,
    wherein a door operator motor is selectively coupled, by a user, to the high-voltage connector or the low-voltage connector according to the external power source; when the door operator motor is electrically coupled to the low-voltage connector, the low-voltage connector enables the rectifier to full-wave rectify the external power source and then to electrically energize the brake; when the door operator motor is electrically coupled to the high-voltage connector, the high-voltage connector enables the rectifier to half-wave rectify the external power source and then to electrically energize the brake.

2. The dual-voltage door operator control system of claim 1, wherein the door operator motor includes a first running winding, a second running winding, and a starting winding; the load side of the contactor includes a first connection terminal, a second connection terminal, a third connection terminal and a fourth connection terminal; when the external power source is a single-phase low-voltage alternating current, the door operator motor is electrically coupled to the low-voltage connector, and the low-voltage connector connects the first running winding of the door operator motor in parallel with the second running winding to form a running winding pair, electrically couples the first connection terminal and the second connection terminal to two ends of the starting winding respectively, and electrically couples the third connection terminal and the fourth connection terminal to two ends of the running winding pair.

3. The dual-voltage door operator control system of claim 1, wherein the door operator motor includes a first running winding, a second running winding and a starting winding; the load side of the contactor includes a first connection terminal, a second connection terminal, a third connection terminal and a fourth connection terminal; when the external power source is a single-phase high-voltage alternating current, the door operator motor is electrically coupled to the high-voltage connector, and the high-voltage connector connects the first running winding of the door operator motor in series with the second running winding to form a running winding string, electrically couples the first connection terminal to one end of the starting winding, electrically couples the other end of the starting winding between the first running winding and the second running winding, and electrically couples the third connection terminal and the fourth connection terminal to two ends of the running winding string respectively.

4. The dual-voltage door operator control system of claim 2, wherein two AC voltage input ends of the rectifier are electrically connected to the third connection terminal and the fourth connection terminal respectively, and two DC voltage output ends of the rectifier are electrically connected to the brake.

5. The dual-voltage door operator control system of claim 1, wherein the door operator motor includes a plurality of windings; the load side of the contactor includes a first connection terminal, a second connection terminal and a third connection terminal; when the external power source is a three-phase low-voltage alternating current, the door operator motor is electrically coupled to the low-voltage connector, and the low-voltage connector enables the plurality of windings of the door operator motor to form a Y-Y connection and electrically couples the first connection terminal, the second connection terminal and the third connection terminal to three outer connection terminals of the Y-Y connection respectively.

6. The dual-voltage door operator control system of claim 5, wherein the plurality of windings includes a first winding, a second winding, a third winding, a fourth winding, a fifth winding and a sixth winding; in the Y-Y connection, the first winding is connected in parallel with the second winding, the third winding is connected in parallel with the fourth winding, and the fifth winding is connected in parallel with the sixth winding, thereby forming three winding pairs, one ends of the three winding pairs are connected to each other, and the other ends of the three winding pairs constitute the three outer connection terminals.

7. The dual-voltage door operator control system of claim 5, wherein two AC voltage input ends of the rectifier are electrically connected to the external power source, one of two DC voltage output ends of the rectifier is electrically coupled to the brake through at least one of the high-voltage connector and the low-voltage connector, and the other of the two DC voltage output ends of the rectifier is electrically coupled to the brake through the contactor.

8. The dual-voltage door operator control system of claim 1, wherein the door operator motor includes a plurality of windings; the load side of the contactor includes a first connection terminal, a second connection terminal and a third connection terminal; when the external power source is a three-phase high-voltage alternating current, the door operator motor is electrically coupled to the high-voltage connector, and the high-voltage connector enables the plurality of windings of the door operator motor to form a Y connection and electrically couples the first connection terminal, the second connection terminal and the third connection terminal to three outer connection terminals of the Y connection respectively.

9. The dual-voltage door operator control system of claim 8, wherein the plurality of windings includes a first winding, a second winding, a third winding, a fourth winding, a fifth winding and a sixth winding; in the Y connection, the first winding is connected in series with the second winding, the third winding is connected in series with the fourth winding, and the fifth winding is connected in series with the sixth winding, thereby forming three winding strings, one ends of the three winding strings are connected to each other, and the other ends of the three winding strings constitute the three outer connection terminals.

10. The dual-voltage door operator control system of claim 8, wherein two AC voltage input ends of the rectifier are electrically connected to the external power source, one of two DC voltage output ends of the rectifier is electrically coupled to the brake through at least one of the high-voltage connector and the low-voltage connector, and the other of the two DC voltage output ends of the rectifier is electrically coupled to the brake through the contactor.

* * * * *